Patented Sept. 17, 1935

2,014,766

UNITED STATES PATENT OFFICE 2,014,766

PROCESS FOR ALKYLATION OF AROMATIC BODIES

Robert M. Isham, Okmulgee, Okla., assignor of three-fourths to William B. Pine, Okmulgee, Okla.

No Drawing. Application April 30, 1934, Serial No. 723,274

5 Claims. (Cl. 260—168)

This invention relates to a process for the production of alkylated aromatic bodies, and has for an object the provision of a novel method for the production of such bodies by the union of olefins therewith. Other objects will appear hereinafter as the description of the invention proceeds.

In a co-pending application I have described and claimed a process for the production of alkylated, sulfonated and esterified aromatic bodies which, generally stated, consists in reacting an aromatic body with a sulfonating agent and an olefin, or a previously sulfonated aromatic body with an olefin, to the end that the aromatic nucleus is alkylated and the sulfonic acid group is esterified. The aforesaid process thus results in the production of sulfonated and usually esterified products.

The present invention provides a process whereby alkylation of aromatic bodies is obtained without sulfonation and in the absence of sulfonating agents. I have now discovered that an aromatic body can be alkylated by the direct union of an olefin therewith in the presence of a suitable sulfonic acid, without sulfonation and in the absence of sulfonating agents, by a simple, direct and practicable process.

The process can be employed for the alkylation of mono-cyclic aromatic bodies such as benzene, toluene, etc., and also of polycyclic aromatic bodies such as naphthalene, anthracene, phenanthrene, etc. It can also be applied to a variety of substituted aromatic bodies such as chlor derivatives, phenols, amines, nitro derivatives, etc., and it will be understood that the expression "aromatic body" as used hereinafter and in the claims is intended to include such derivatives and substituted bodies.

Any suitable or desired olefin or mixture of olefins can be employed. For example, butylene, propylene and amylene give rise to the correspondingly alkylated aromatic bodies such as butylated, propylated or amylated bodies, and when mixtures of olefins are employed, the alkylated bodies contain alkyl groups of various sizes. The selection of the particular olefin or mixture of olefins in any case will therefore depend on considerations such as the availability of the materials and what alkyl groups it is desired to introduce into or add to the aromatic body. Instead of pure olefins or mixtures thereof, any suitable olefin bearing material may also be employed such as pressure still gas, cracked gasoline, or the like.

The olefin and the aromatic body to be alkylated are reacted in the presence of a sulfonic acid which seems to act as a carrier or catalyst in the process. The sulfonic acid itself may be alkylated in addition to the aromatic body, but this does not interfere with the desired alkylation of the aromatic bodies themselves, the latter after alkylation being separated and recovered from the sulfonic acid and the sulfonic acid being preferably recovered for further use. The sulfonic acid may be either aromatic or aliphatic, suitable acids mentioned by way of example being benzene sulfonic acid or naphthalene sulfonic acid, ethylene di-sulfonic acid, etc. The quantity of sulfonic acid to be employed is not critical, since the acid acts as a carrier and is continuously regenerated during the reaction.

In carrying out the process, the aromatic body or bodies to be alkylated are heated in the presence of the desired sulfonic acid and maintained at an elevated temperature, preferably between 80° to 130° C. The desired olefin or olefin bearing material, if gaseous, is conducted into the mixture and is rapidly absorbed, or if liquid may be added to and mixed with the aromatic body and acid the quantity being sufficient to complete the reaction. In general, the mixture should be agitated during the reaction in order to insure thorough mixing of the reagents, although this is not essential particularly when the olefin is added in liquid form.

In a typical example of the process, 40 gms. of naphthalene where mixed with 40 gms. of naphthalene sulfonic acid and the mixture heated to a temperature between 110° and 120° C. Propylene gas was then conducted into the mixture, with agitation, and rapid absorption of the gas took place, the treatment with propylene being continued until 48 gms. had been absorbed. The reaction mixture was then treated for the recovery of the alkylated naphthalene, being first poured into water and heated until the propylated naphthalene separated as a clear yellow layer on the surface, which upper layer then solidified when the mixture was allowed to cool. This solidified layer was then removed and again melted over hot water and allowed to crystallize by cooling, the alkylated naphthalene then being separated and distilled. The bulk of this product distilled at a temperature of 329° to 331° C. and consisted of di-isopropyl naphthalene. Small amounts of mono-isopropyl naphthalene and of tri- and tetra-isopropyl naphthalene were also present.

The water washings were then evaporated and the sulfonic acid recovered for further use.

Analysis of this acid showed it to be practically pure di-isopropyl naphthalene sulfonic acid.

In another example of the process 44.5 gms. of phenol were mixed with 40 gms. of naphthalene sulfonic acid and treated with propylene gas at a temperature between 80° and 100° C. until 56 gms. of the gas had been absorbed. The acid was then washed out with water and the alkylated phenol was separated into cumol (isopropyl phenol) and isopropyl cumyl ether (isopropyl phenyl isopropyl ether) by extraction with sodium hydroxide solution. Approximately 20% of the mixture was cumol and the remaining 80% was principally isopropyl cumyl ether.

In a further example chlor benzene was treated with propylene gas in the presence of ethylene di-sulfonic acid and in the manner described above. In this case the absorption of propylene was less rapid, due to the influence of the electronegative chlorine substituent, but the chlor benzene was converted to chlor cumene.

The foregoing examples serve to illustrate the results obtained by an alkylation process embodying the invention. When naphthalene and the like are alkylated, the resulting products generally comprise a series of more or less highly alkylated naphthalenes, which in the case of the use of propylene consisted of mono-, di-, tri- and higher isopropyl naphthalenes. Similarly, benzene is converted to cumene and more highly alkylated benzenes, and toluene is converted into cymene, etc., when treated with propylene under the conditions described above. When the invention is employed for the alkylation of substituted aromatic bodies, and the substituent group is reactive as in the case of phenols and amines for example, alkylation of the substituent group may also take place together with alkylation of the nucleus. Thus phenol, in the example given above, was treated with propylene in the presence of di-isopropyl naphthalene sulfonic acid with the resulting production of a mixture of cumol and isopropyl cumyl ether. Aniline is similarly alkylated both in the benzene nucleus and in the amino group. Nitro-benzol when treated in a similar manner is converted into nitro-cumene, and benzoic acid is both alkylated and esterified.

It will be understood that the invention is not limited to the specific examples given above and that other aromatic bodies, olefins or olefin-bearing materials, and sulfonic acids, either aromatic or aliphatic, may be employed as starting materials. The specific materials employed in carrying out the process will accordingly vary depending on materials available and the uses to which the product is to be put, and the proportions and the details of the procedure may also be varied without departing from the spirit of the invention. Reference will therefore be had to the appended claims for a definition of the limits of the invention.

What is claimed is:

1. A process which consists in reacting naphthalene and a sulfonic acid with an olefinic material to alkylate the naphthalene while maintaining a temperature of the order of 80° C. to 130° C., and recovering the alkylated naphthalene.

2. A process which consists in introducing propylene into a mixture of naphthalene and naphthalene sulfonic acid while maintaining a temperature of the order of 80° C. to 130° C. and recovering the propylated naphthalene.

3. A process for forming alkylated aromatic hydrocarbons which consists in mixing an aromatic hydrocarbon with an olefin while heating the reaction mixture and in the presence of a sulfonic acid, and recovering the alkylated aromatic hydrocarbon from the reaction mixture.

4. A process for forming alkylated aromatic hydrocarbons which consists in reacting an olefin with an aromatic hydrocarbon in the presence of a sulfonic acid and in the absence of sulfuric acid while maintaining a temperature between the approximate limits of 80° C. and 130° C., and recovering the alkylated aromatic hydrocarbon from the reaction mixture.

5. A process for forming alkylated aromatic hydrocarbons which consists in introducing an olefinic gas into a mixture of an aromatic hydrocarbon and a sulfonic acid in the absence of sulfuric acid while maintaining a reaction temperature of the order of 80° C. to 130° C., and recovering the alkylated aromatic hydrocarbon from the reaction mixture.

ROBERT M. ISHAM.